United States Patent [19]

Narang et al.

[11] Patent Number: 5,061,581
[45] Date of Patent: Oct. 29, 1991

[54] NOVEL SOLID POLYMER ELECTROLYTES

[75] Inventors: Subhash C. Narang, Redwood City; Digby D. MacDonald, Fremont, both of Calif.

[73] Assignee: SRI International, Menlo Park, Calif.

[21] Appl. No.: 476,270

[22] Filed: Feb. 7, 1990

[51] Int. Cl.[5] .................................... H01M 10/40
[52] U.S. Cl. ................................. 429/192; 252/62.2
[58] Field of Search ...................... 252/62.2; 429/192

[56] References Cited

U.S. PATENT DOCUMENTS

| | | | |
|---|---|---|---|
| 4,303,748 | 12/1981 | Armand et al. | 429/192 |
| 4,357,401 | 11/1982 | Andre et al. | 429/192 |
| 4,556,614 | 12/1985 | le Mehaute et al. | 429/192 X |
| 4,578,326 | 3/1986 | Armand et al. | 429/192 |
| 4,683,181 | 7/1987 | Armand et al. | 429/192 |

OTHER PUBLICATIONS

M. B. Armand et al., "Poly-Ethers as Solid Electrolytes", in *Fast Ion Transport in Solids: Electrodes and Electrolytes*, Ed. P. Vashishta et al. (New York: North-Holland, 1979).
M. B. Armand, "Current State of PEO-Based Electrolyte", in *Polymer Electrolyte Reviews*, Eds. MacCallum and Vincent.
P. M. Blonsky et al., *J. Am. Chem Soc.* 106:6854 (1984).
M. Gauthier et al., *J. Electrochem. Soc.: Electrochemical Science and Technology*, 132:1333 (Jun. 1985).
J. M. Parker et al., *Polymer* 14:589 (1973).
D. F. Shriver et al., *Solid State Ionics* 5:83–88 (1981).
D. F. Shriver et al., "Solid Ionic Conductors", in *Chemical & Engineering News*, May 20, 1985.
P. V. Wright, *Br. Polymer J.* 7:319 (1975).

Primary Examiner—Stephen J. Kalafut
Attorney, Agent, or Firm—Irell & Manella

[57] ABSTRACT

An amorphous ionically conductive macromolecular solid is set forth having improved ambient temperature ionic conductivity. The solid comprises a solid solution of at least one positively charged ionic species dissolved in a macromolecular material, the macromolecular material comprising a polymer or copolymer having a polyether structure and having at least a portion of the ether oxygens thereof replaced with S or NR wherein R includes at least one basic site capable of associating with the positively charged ionic species and has 2 to 10 carbon atoms. Relatively high conductivity is a feature of the macromolecular solid of the invention.

14 Claims, 4 Drawing Sheets

× 10% S
○ 20% S
△ N-SOO
● 14% S
◆ 33% S
+ 50% S (SOSO)
□ N-CH$_2$OC$_2$H$_5$
■ 60% S
◊ 50% S (SSOO)
⊞ 40% S
▲ PEO

× 10% S
○ 20% S
△ N-SOO
● 14% S
◆ 33% S
+ 50% S (SOSO)
□ N-CH$_2$OC$_2$H$_5$
■ 60% S
◇ 50% S (SSOO)
⊞ 40% S
▲ PEO

FIG. 4

NOVEL SOLID POLYMER ELECTROLYTES

FIELD OF INVENTION

The invention relates to solid polymer electrolytes useful in rechargeable batteries, power supplies, capacitors and microelectrochemical sensors.

BACKGROUND ART

Use of solid electrolytes goes back to Michael Faraday's report in 1834 that solid lead fluoride at red heat would conduct electricity as would the metallic vessel in which he was heating it. More recently, the use of polymers of ethylene oxide and/or propylene oxide, sometimes along with other copolymeric materials, has provided a solid polymer material useful as an electrolyte and as a positive electrode material in high rate thin film batteries or capacitors capable of pulse discharge. Such materials are described, for example, in U.S. Pat. No. 4,578,326, issued Mar. 25, 1986 to Michel Armand, et al and in U.S. Pat. No. 4,683,181, issued July 28, 1987, to Michel Armand, et al. A more general description of such electrolytes can be found in the May 20, 1985 volume of Chemical and Engineering News, pages 43, 44 and 50-57. This article, particularly on pages 54-55 discusses polymeric solid electrolytes including poly (ethylene oxide) polymers (PEO) and polymers using a highly flexible polyphosphazene backbone to which short-chain polyether groups are attached.

High energy density, rechargeable solid polymer electrolyte (SPE) using solid state batteries, for example, the $Li/SPE/TiS_2$ or $Li/SPE/V_6O_{13}$ systems, promise virtually maintenance-free reliable operation over many thousands or ten of thousands of cycles if certain physico-chemical problems can be overcome. The most important problems are as follows:

(1) The low mobility of $Li^+$ in the SPE.
(2) The difficulty of maintaining intimate contact between the SPE and the lithium negative and $TiS_2$ interaction positive electrodes.
(3) The occasional growth of a lithium dendrite that penetrates the SPE on recharging.
(4) Low positive electrode utilization on rapid charging. This problem is not due to the SPE itself, but reflects a limitation of existing intercalation positive electrodes (e.g., $TiS_2$).
(5) Long-term thermal stability at the temperatures at which SPE batteries are likely to operate (e.g., 80°-100° C.).

Research has expanded considerably in the development of solid polymer electrolytes for applications in high energy density batteries, specific ion sensors, and electronic displays. Wright and coworkers (British Polymer Journal 7, 319(1975) and Polymer 14, 589 (1973)) originally observed the ionic conductivity of complexes of alkali metal salts with poly(ethyleneoxide). M. B. Armand, and coworkers (Fast Ion Transport in Solids, Ed. P. Vashishita, North Holland, N.Y. (1979) p. 131; Second International Meeting on Solid Electrolytes, Saint Andrews University, Scotland (1978); Journal of the Electrochemical Society 132, 1333(1985)) developed a detailed understanding of the ionic conductivity of poly(ethylene oxide) (PEO) and poly(propylene oxide) (PPO) salt complexes and proposed their use as solid polymer electrolytes in high energy density batteries. For the PEO-salt complexes, it has been suggested that the alkali metal cations reside in the helical tunnel of PEO, which is in a $(T_2GT_2\overline{G})$ conformation. This structure is similar to the complexes between $Li^+$, $Na^+$, $K^+$ and crown ethers. However, PEO and PPO complexes show ionic conductivity only above 100° C. Recently, Blonsky, et al. (J. Amer. Chem. Soc. 106, 6854 (1984)) synthesized poly(phosphazene)-based ionic conductors that show good ionic conductivity at room temperature. However, the ionic conductivities are still too low to meet the power density requirements ($>100$ W $kg^{-1}$ sustained power) for high density, rechargeable battery applications.

Because SPEs, such as those based on poly(ethylene oxide) and polyphosphazene, are flexible, maintenance of intimate contact with the solid anode and cathode is less of a problem than with rigid solid electrolytes (e.g., Li-conducting glasses). However, the extent to which contact can be maintained depends on the negative (Li) and positive (e.g., $TiS_2$, $V_6O_{13}$) electrodes on charging and discharging.

These problems would be greatly alleviated if it were possible to use relatively thick ($>500\mu$) SPE films, rather than films of $<100\mu$ as currently used. The thin films that are now used are dictated by the low lithium ion conductivities of existing SPEs (See, for example, D. F. Shriver et al., Solid State Ionics 5, 83 (1981) and Chem. Eng. News (May 20, 1985) p. 42). Therefore, a principal goal in developing SPE batteries is to increase the cation conductivity. This can be done only by providing new polymer systems that have the necessary structural properties to ensure high and stable cation conductivities under the conditions of interest.

Two factors are critical to the transport of ions in polymer electrolytes: (1) liquid-like (amorphous) character of the polymer and (2) sites in the polymer that loosely bind with the ion to permit diffusion. Thus, having "floppy" polyether pendant groups on the polyphosphazene elastomer greatly reduces the glass transition temperature ($T_g$) of the polymer. Consequently, when complexed with salts, this polymer shows substantially higher room temperature conductivity than the corresponding PEO complexes. However, the ionic conductance exhibited by the polyphosphazene electrolyte at room temperature is still too low for application in batteries. In addition, these polyphosphazene based electrolytes do not form good uniform flexible films.

The present invention is directed to overcoming one or more of the problems as set forth above.

DISCLOSURE OF INVENTION

In accordance with an embodiment of the present invention an amorphous ionically conductive macromolecular solid is disclosed having improved ambient temperature ionic conductivity. The solid comprises a solid solution of at least one ionic species, said species including a cation, dissolved in a macromolecular material, the macromolecular material comprising a polymer or copolymer having a polyether structure and having at least a portion of the ether oxygens thereof replaced with S or NR wherein R includes at least one electronegative site capable of associating with the cation and has 2 to 10 carbon atoms.

The amorphous (non-crystalline) character of the ionically conductive macromolecular solid allows for motion of the polymer to assist in the migration of ions such as $Li^+$ through the solid from one electrode to another. The existence of the S and/or NR groups provides basic sites at which the positive ion, for example, $Li^+$, is retained with lesser strength than it is retained in ethylene oxide or propylene oxide materials by the oxygens of the ether linkage. Thus, the positive ion is more mobile in such a polymer electrolyte.

BRIEF DESCRIPTION OF DRAWINGS

The invention will be better understood by reference to the figures of the drawings wherein like partes denote like parts throughout and wherein.

BEST MODE FOR CARRYING OUT INVENTION

The interaction between the alkali ion and the ether oxygen in the polymer complexes is a strong hard-acid/hard-base interaction as defined by the hard soft acid base (HSAB) principle. It has been found that the activation energy necessary for "hopping" of the alkali metal ion between sites can soft base like sulfur (or NR). Additionally, the conductance of the polymer complexes can be enhanced by organizing the pendant basic sites so that the "hopping" is stereochemically unhindered.

In accordance with the present invention an amorphous ionically conductive macromolecular solid is set forth which has improved ambient temperature ionic conductivity. The solid includes a solid solution of at least one ionic species, including a cation, generally an alkali metal ion or ammonium ion, dissolved in a particular macromolecular material. The macromolecular material comprises a polymer or a copolymer having a polyether structure and having at least a portion of the ether oxygens replaced with either S or NR wherein R includes at least one basic site capable of associating with the cation and has 2 to 10 carbon atoms.

Typical macromolecular materials useful in the practice of the invention may have, for example, any of the structures set forth in following Table I.

TABLE I

| | STRUCTURES OF SOLID POLYMER ELECTROLYTES | |
|---|---|---|
| | Polymer Unit | S/O % |
| (1) | $(-SCH_2CH_2SCH_2CH_2SCH_2CH_2OCH_2CH_2-)_n$ | 75 |
| (2) | $(-SCH_2CH_2SCH_2CH_2SCH_2CH_2OCH_2CH_2OCH_2CH_2-)_n$ | 60 |
| (3) | $(-SCH_2CH_2OCH_2CH_2-)_n$ | 50 |
| (4) | $(-SCH_2CH_2SCH_2CH_2OCH_2CH_2OCH_2CH_2-)_n$ | 50 |
| (5) | $(-SCH_2CH_2SCH_2CH_2OCH_2CH_2OCH_2CH_2OCH_2CH_2-)_n$ | 40 |
| (6) | $(-SCH_2CH_2OCH_2CH_2OCH_2CH_2-)_n$ | 33.33 |
| (7) | $(-SCH_2CH_2OCH_2CH_2OCH_2CH_2OCH_2CH_2OCH_2CH_2-)_n$ | 20 |
| (8) | $(-S-(CH_2CH_2O)_6-CH_2CH_2-)_n$ | 14 |
| (9) | $(-S-(CH_2CH_2O)_9-CH_2CH_2-)_n$ | 10 |
| (10) | $((-CH_2CH_2SCH_2CH_2O)_{.7} (-CH_2CH_2SCH_2CHO-)_{.3})_n$ <br> $\quad\quad\quad\quad\quad\quad\quad\quad\quad\quad\quad\quad\quad\quad\quad\quad\quad\quad |$ <br> $\quad\quad\quad\quad\quad\quad\quad\quad\quad\quad\quad\quad\quad\quad\quad\quad\quad CH_3$ | |
| (11) | $(-CH_2NCH_2-)_n$ <br> $\quad\quad\quad |$ <br> $\quad\quad\quad D$ <br> where D is $-CH_2OCH_2CH_3$ | |
| (12) | $(-CH_2-NCH_2-)_n$ <br> $\quad\quad\quad\quad |$ <br> $\quad\quad\quad\quad D$ <br> where D is $CH_2CH_2OCH_2CH_3$ | |
| (13) | $(-CH_2NCH_2-)_n$ <br> $\quad\quad\quad |$ <br> $\quad\quad\quad E$ <br> where E is <br> $-CH_2CH_2SCH_2OCH_2CH_2OCH_3$ <br> (referred to as N-SOO) | |

The listed sulfur containing macromolecular materials have the mole percents sulfur shown in the right-hand column with such percents sulfur representing the percent of the oxygen which has been replaced by sulfur.

Structures 11-13 show compounds wherein all of the oxygens have been replaced with a group NR and wherein the R group is significantly different in each instance. In the instance of structures 11 and 12 an ether linkage exists in the R group whereby association to a cation is possible. In the structure labelled 13 a thioether linkage is present in addition to two ether linkages. It should be noted that the above structures are not meant to be exhaustive of the possibilities in this respect but are, instead, only meant to be illustrative of a few of such macromolecular materials. More generally, the group "R" can have from 2 to 10 carbon atoms and may contain substantially any electronegative site which is capable of associating with the cation. And, macromolecular materials are useful wherein some of the oxygens are replaced by sulfurs and others by NR groups. Still further, it should be recognized that copolymers may be made with ethylene oxide, propylene oxide, and the like, if desired, and that such will still fall within the scope of the invention so long as they have the replacement S and/or NR substituents.

The molecular weight of the macromolecular material of the present invention will generally fall within a range from about 10,000 to about 3,000,000, and will preferably fall within a range from about 100,000 to about 1,000,000.

With respect to the ionic compound such may comprise, for example, any of the following: LiCl, NaCl, KCl, LiCF$_3$SO$_3$, LiClO$_4$, LiAsF$_6$, LiPF$_6$, LiBF$_4$, LiBr, LiI, LiSCN, LiOOCR', where R' may be alkyl, alkenyl, alkynyl or aromatic and includes 1 to 10 carbon atoms. Preferably, the cation is sodium or lithium.

The term ambient temperature as used herein relates to temperatures in the range from about 15° C. to about 45° C. and more usually to temperatures in the range from about 18° C. to about 40° C.

The macromolecular material in accordance with the invention generally has the formula:

—(X—C(R$_1$)$_2$C(R$_1$)$_2$—Y—C(R$_1$)$_2$C(R$_1$)$_2$)$_n$— wherein X and Y are the same or different and are each independently O, S or NR wherein R includes at least one ether or thioether linkage or group —PO, —PO$_2$, —PO$_3$, —SbO, —SO, —SO$_2$, —NR''$_2$ or —AsO, which serves as a basic site capable of associating with the cation. Generally, each R will include 2 to 10 carbon atoms. It may also include other atoms such as oxygen, sulfur, phosphorous, arsenic, antimony, nitrogen and hydrogen. Generally, at least about 25% of all X and Y are O. Generally no more than about 98% of all X and Y are O. Each R'' may independently be hydrogen or alkyl, alkenyl or aryl with 1 to 10 carbon atoms.

Each R$_1$ is the same or different and is independently hydrogen or a C$_{1-4}$ saturated or unsaturated hydrocarbon radical optionally substituted with triallylsilyl, oxygen, sulfur or phosphate.

The amorphous ionically conductive macromolecular solid of the present invention can be formulated as using conventional polymerization techniques. The (thio-oxyethylenes) were synthesized by two methods. In one method, thio-oxyethylene dithiols were reacted with equimolar amounts of thio-oxyethylene dichloride. This method provided polymers with molecular weights not exceeding 10,000 daltons. The second method, the reaction of thio-oxyethylene dithiols with N,N'-diisopropyl-O-ethyleneglycol bisisoureas, gave polymers with higher weight average molecular weights. Examples I–IX illustrate the formation of several such polymers. Example X illustrates the synthesis of a polymer with a side chain.

EXAMPLE I

Synthesis of Poly(thioether) 14% S

Hexaethyleneglycol (5 g, 15.3 mmol) was placed in a 100 mL round-bottomed flask and dissolved in anhydrous dimethylformamide (20 mL) under nitrogen. Triphenylphosphine (9.03 g, 30.6 mmol) was added to the solution. Bromine (5 g) was added dropwise to the reaction mixture until persistence of an orange color. The addition was exothermic and the reaction temperature was controlled below 30° C. by external cooling. The reaction mixture was stirred overnight under nitrogen. A precipitate which had formed was isolated and discarded. The dimethylformamide in the filtrate was distilled off under vacuum. The residue was taken up in water and extracted three times from methylene chloride (60 mL each). The organic layer was washed a few times with 10% NaOH and water and then dried over magnesium sulfate. After distillation of the solvent by rotary evaporation, the residue was flash chromatographed through silica gel using methylene chloride/acetone, 10:1 as eluent. Pure 3.6.9.12.15.18-Hexaoxo-1,20-dibromoeicosane product (2 g) was isolated along with mixed fractions.

The 3.6.9.12.15.18-Hexaoxo-1,20-dibromoeicosane (2 g, 4.42 mmol) and thiourea (0.73 g, 9.60 mmol) were dissolved in 95% ethanol (10 mL) at reflux. The reaction mixture was refluxed overnight. The solvent was distilled off and the residue was dissolved in water and methanol (30 mL and 10 mL, respectively). KOH (5 g) was added to the solution and the solution was refluxed overnight. After evaporation of the solvents the residue was flash chromatographed on silica gel using methylene chloride/acetone, 85:15, as eluent. The 3,6,9,12,15,18-Hexaoxa-1,20-eicosanedithiol product (0.5 g) was isolated in 33% yield.

Heptamethyleneglycol (5 g, 15.3 mmol) was weighed into a 25-mL round bottomed flask under nitrogen. A catalytic amount of anhydrous copper chloride (62 mg) was added to the flask. 3,3'-Diisopropylcarbodiimide (4.06 g, 32.2 mmol) was added. The reaction mixture was stirred at room temperature for 24 hours. Anhydrous hexane (100 mL) was added to the reaction mixture and the resulting solution was filtered through Celite. After evaporation of the solvent the desired heptaethylglycol diisopropylbisisourea product was recovered in quantitative yield.

3,6,9,12,15,18-Hexaoxa-1,20-eicosanedithiol (0.48 g., 1.34 mmol), heptaethylglycol diisopropylbisisourea (0.775 g., 1.34 mmol), and anhydrous potassium fluoride (0.124 g., 2.14 mmol) were transferred into a glass ampoule, that was then degassed and sealed under vacuum. The reaction mixture was heated at 140° C. for three days. After cooling down, a few mLs of chloroform were added to the reaction mixture, and the insoluble potassium fluoride and diisopropylurea were filtered out. The polymer was dialyzed (molecular weight cut-off 3,500) in water/methanol 1:1 for three days. The polymer was recovered as a viscous oil (0.55 g) and was characterized by $^1$H NMR and gel permeation chromatography (6000 daltons average weight molecular weight.

EXAMPLE II

Synthesis of Poly(thioether) 20% S 3,6,9,12-Tetraoxa-1,14-tetradecanedithiol (1.6 g., 5.92 mmol), pentaethylene glycol diisopropylbis-isourea (2.16 g., 5.92 mmol) and anhydrous potassium fluoride (0.55 g., 9.45 mmol) were transferred into a glass ampoule. The glass ampoule was degassed, sealed under vacuum and heated at 140° C., in an oil bath, for three days. After this time, the reaction mixture was transferred into a beaker and stirred in chloroform, and were removed by filtration. The filtrate was concentrated, methanol was added and the mixture was transferred into a dialysis bag (molecular weight cut-off 3500) and dialyzed against water/methanol 1:1. The polymer was isolated as a viscous oil in 60% yield, and characterized by $^1$H NMR and gel permeation chromatography (105,000 daltons average weight molecular weight against monodispersed polystyrenes).

EXAMPLE III

Synthesis of Poly(thioether) 50% S (SOSO)

2-Mercaptoethylether (8 g., 57.87 mmol), disopropyldiethylene glycol bisisourea (20.75 g., 57.87 mmol) and anhydrous potassium fluoride (5.38 g., 92.59 mmol) were weighed into a glass ampoule, degassed and sealed under vacuum. The reaction vessel was heated in an oil bath at 140° C. for six days. Chloroform was added to the reaction mixture, and the insoluble diisopropylurea and potassium fluoride were filtered out. The filtrate was concentrated and added to methanol, where the polymer precipitated out as a slightly yellow solid. The product, after drying at 25° C. at 0.1 torr for sixteen hours, was isolated in 65% yield (7.83 g).

EXAMPLE IV

Synthesis of Poly(thioether) 10% S 3,6,9,12,15,18,21,24,27-Nonaoxa-1,30-dibromotriacontane was contacted in one to one mole ratio with $Na_2S$ and with tricaprylmethylammonium chloride (one-tenth the molar amount of $Na_2S$), the latter two reactants being dissolved in water, for approximately 96 hours at 100° C. to produce the desired product.

EXAMPLE V

Synthesis of Poly(thioether) 75% S

The desired compound was synthesized by each of two methods (A and B) as follows:

Method A

2-Mercaptoethylsulfide (1.2 g, 7 mmol) was transferred into a 100 mL round-bottomed flask under nitrogen. Absolute ethanol (10 mL) was poured into the flask, and tetramethylammonium hydroxide pentahydrate (2.62 g, 14 mmol) was added. The reaction solution was heated at reflux. 2-Chloroethylether (1 g, 7 mmol) was dissolved in anhydrous benzene (30 mL) and quickly added to the reaction solution. The reaction was refluxed overnight. The formed precipitate was filtered out, stirred twice in ethanol (50 mL), and filtered again. After drying at 40° C. under vacuum, 1 g (64% yield) was collected. The polymer was insoluble in most of the common organic solvents; however, it was soluble in hot dimethylformamide and hot dimethylsulfoxide. The polymer was characterized by $^1H$ NMR in $d_6$-dimethylsulfoxide: no molecular weight determination was made.

Method B

2-Mercaptoethylsulfide (4 g, 25.92 mmol), N,N'-diisopropyl-O-diethyleneglycol bisisourea (9.29 g, 25.92 mmol) were weighed into a glass ampoule, degassed, and sealed under vacuum. The tube was heated in an oil bath at 140° C. for 113 hours. The product was removed from the ampoule, stirred in chloroform, and filtered. The filtrate was concentrated and added to methanol. Just a small amount of solid precipitated out (about 300 mg). Most of the reaction product was therefore isolated in the chloroform-insoluble portion. The gray solid was very hard and could not be dissolved in common organic solvents.

EXAMPLE VI

Synthesis of Poly(thioether) 60% S

The desired compound was synthesized by each of two methods (A and B) as follows:

Method A

2-Mercaptoethylsulfide (4.58 g, 26.7 mmol) and tetramethylammonium hydroxide pentahydrate (9.68 g, 53.4 mmol) were weighed into a 250-mL round-bottomed flask and dissolved in ethanol (20 mL). The solution was heated to 80° C., and 1,2-bis(2-chloroethoxy)ethane (5 g, 26.7 mmol) dissolved in benzene (150 mL) was added at once. The solution was stirred and heated for 20 hours. On cooling of the reaction, a white solid precipitated out. It was filtered and washed with methanol. The solid was stirred in water (100 mL) and filtered again. After drying at 40° C. under vacuum, a white solid (4.21 g, 58.7%) was collected. No molecular weight analysis was run since the product was insoluble in tetrahydrofuran.

Method B

2-Mercaptoethylsulfide (12.96 g, 12.96 mmol), N,N'-diisopropyl-O-triethyleneglycol bisisourea (5.22 g, 12.96 mmol), and anhydrous potassium fluoride (1.20 g, 20.74 mmol) were weighed into a glass ampoule, degassed, and sealed under vacuum. The ampoule was heated at 140° C. for 94.5 hours. The product was removed from the ampoule and stirred in chloroform. The insoluble portion was collected by filtration and washed a few times with methanol and water. After drying under vacuum at room temperature for 16 hours, a gray powder (2.12 g) was obtained that was insoluble in methanol, water, dimethylsulfoxide, tetrahydrofuran, and chloroform. No. molecular weight analysis was run.

EXAMPLE VII

Synthesis of Poly(thioether) 40% S

The desired compound was synthesized by each of two methods (A and B) as follows:

Method A

2-Mercaptoethylether (5.5 g, 36.2 mmol) and tetramethylammonium hydroxide pentahydrate (13.2 g, 72.4 mmol) were weighed in a 250-mL round-bottomed flask and dissolved in ethanol (10 mL). 1,2-Bis(2-chloroethoxy)ethane (6.67 g, 36.2 mmol) was dissolved in benzene (100 mL) and added to the reaction. The reaction was stirred under reflux overnight. After cooling, the ethanolic phase was separated from the benzene phase. The benzene was distilled off and the residue was dried under vacuum at 100° C. for two hours. A white solid (9 g) was obtained. The polymer was dissolved in tetrahydrofuran, and an average weight molecular weight of 4,100 daltons was found by GPC analysis.

Method B 1,2-Mercaptoethylether (8 g, 57.87 mmol), N,N'-diisopropyl-O-triethyleneglycol bisisourea (23.30 g, 57.87 mmol), and potassium fluoride (5.38 g, 92.59 mmol) were transferred into a glass ampoule, degassed, and sealed under vacuum. The tube was heated at 140° C. for six days. The product was then stirred in chloroform, and the insoluble portion was filtered out. The concentrated chloroform solution was added dropwise into methanol, and the precipitate was collected by filtration. After drying at room temperature under vacuum overnight, a slightly yellow solid product (2.64 g) was collected. The polymer was almost totally insoluble in tetrahydrofuran, so GPC analysis could not be run.

EXAMPLE VIII

Synthesis of Poly(thioether) 33% S

The desired compound was synthesized by each of two methods (A and B) as follows:

9 …

Method A 3,6-dioxo-1,8-dimercaptooctane (7 g, 38.4 mmol) and tetramethylammonium hydroxide pentahydrate (14 g, 76.8 mmol) were dissolved in ethanol (10 mL). 1,2-Bis(2-chloroethoxy)ethane (7.18 g, 38.4 mmol) was dissolved in benzene (100 mL) and added to the ethanol solution. The reaction was refluxed overnight. The benzene phase was separated from the ethanol phase. The benzene was distilled off, and a pale yellow solid (10.02 g) was obtained. A weight average molecular weight of about 2,000 daltons was determined by GPC analysis.

Method B 3,6-1,8-dimercaptooctane (10 g, 54.87 mmol), N,N'-diisopropyl-O-triethyleneglycol bisisourea (22.09 g, 54.87 mmol), and anhydrous potassium fluoride (5.10 g, 87.79 mmol) were sealed under vacuum in a glass ampoule and heated at 140° C. for six days. The solid residue was stirred in chloroform, and the insoluble portion removed by filtration. The chloroform solution was added dropwise into methanol, and the product was isolated as a white solid by filtration. The polymer was dissolved in tetrahydrofuran, and a weight average molecular weight of 7,400 daltons was calculated versus standard polystyrenes.

EXAMPLE IX

Synthesis of Poly(thioether) 50% S (SSOO)

1,2-Dimercaptoethane (8 g, 0.849 mol), N,N'-diisopropyl-O-triethyleneglycol bisisourea (34.19 g, 0.849 mmol), and anhydrous potassium fluoride (7.89 g, 1.36 mol) were transferred into a glass ampoule, degassed, sealed under vacuum, and heated at 140° C. for six days. The residue was removed from the reaction vessel and stirred in chloroform. The insoluble material was separated by filtration. The solution in chloroform was concentrated and dropped into methanol to precipitate out the product. The milky white fluffy material was filtered, then dried at room temperature under vacuum for 16 hours (yield: 7.5 g). The polymer was dissolved in tetrahydrofuran, and a weight average molecular weight of about 7,000 daltons was determined versus standard polystyrenes.

EXAMPLE X

Synthesis of Polyethyleneimine Derivative (NSOO)

To a stirred solution of methoxyethoxymethyl-thioglycolic acid (1 g) in dichloromethane maintained at 0° C. under nitrogen was added a solution of dicylohexylcarbodiimide (1.14 g) in dichloromethane. After 30 minutes stirring at 0° C., a solution of polyethyleneimine (0.239 g) in dichloromethane was added. The stirred reaction mixture was allowed to warm to room temperature and kept at room temperature for 24 hours. The product was filtered and the filtrate washed successively with 0.1N HCl and brine. The organic extract was dried over anhydrous magnesium sulfate and the solvent evaporated under vacuum. The solid residue was dissolved in dry, distilled tetrahydrofuran under dry nitrogen at 0° C. and borane/tetrahydrofuran solution (1 Molar, 72 mL) was added. The reaction was allowed to warm to room temperature and stirred overnight under nitrogen. The reaction mixture was then heated under reflux for 1 hour. The solvent was removed under vacuum and the residue heated under reflux with methanolic sodium hydroxide (40 mL methanol+20 mL 10% NaOH). Methanol was distilled off and the residue was dissolved in 1N hydrochloric acid and filtered. The filtrate was washed with dichloromethane and the aqueous solution basified with 25% sodium hydroxide. The basic solution was extracted repeatedly with dichloromethane and the organic extract washed with saturated brine. The organic extract was dried over anhydrous magnesium sulfate and filtered. The solvent was distilled off and the polymer residue dried under vacuum to yield the NSOO polymer in 60% yield.

Batteries for testing were prepared as follows:

Materials

All procedures for handling the cell materials were conducted in a nitrogen dry box. Batteries containing Li metal were assembled in an argon dry box to prevent any reaction of lithium with nitrogen to form lithium nitride.

Tetrahydofuran (THF) was distilled from Na/benzophenone under nitrogen before use. Chloroform was distilled from calcium hydride under nitrogen. Acetonitrile was distilled from $P_2O_5$. Lithium trifluoromethanesulfonate ($LiCF_3SO_3$) obtained from Aldrich Chemical Co., was used as received. Lithium ribbon (0.38 mm thick × 50 mm wide) was obtained from AESAR and stored under argon. Ammonium vanadate (Aldrich Chemical Co., 99.99%) was used without further purification. Shawinigan black (50% compressed) was obtained from Chevron Chemical Co., $MoS_2$ cathodes produced by chemical vapor deposition (CVD) on an aluminum substrate were obtained from Polytechnic University, Brooklyn, N.Y. Polyethylene oxide (PEO, M. Wt. 100,000) was obtained from Aldrich Chemical Co., and dried at 140° C. before use.

Equipment And Measurement Technique

Conductivities of the polymers were evaluated by AC impedance spectroscopy. Preparation of the electrolyte films and the $V_6O_{13}$ cathodes and assembly of the batteries are discussed in later sections. A film 6 of the dried polymer electrolyte was sandwiched between two stainless steel blocking electrodes 7,8 that each had an area of 0.7854 cm$^2$ The thickness of the polymer film 6 which typically varied between 0.51 mm and 1.02 mm was measured with a micrometer. The assembly 9 composed of the blocking electrode-polymer sandwich cell 10 inside a Delrin cup 12 (FIG. 1) was transferred to a vacuum chamber 14 that had provision for heating (FIG. 2) and for applying a constant pressure of 65–97 lb/in$^2$ across the polymer film 6. The electrodes 7,8 were connected to a potentiostat (PAR 173) operating in the galvanostatic mode.

Figure 1:
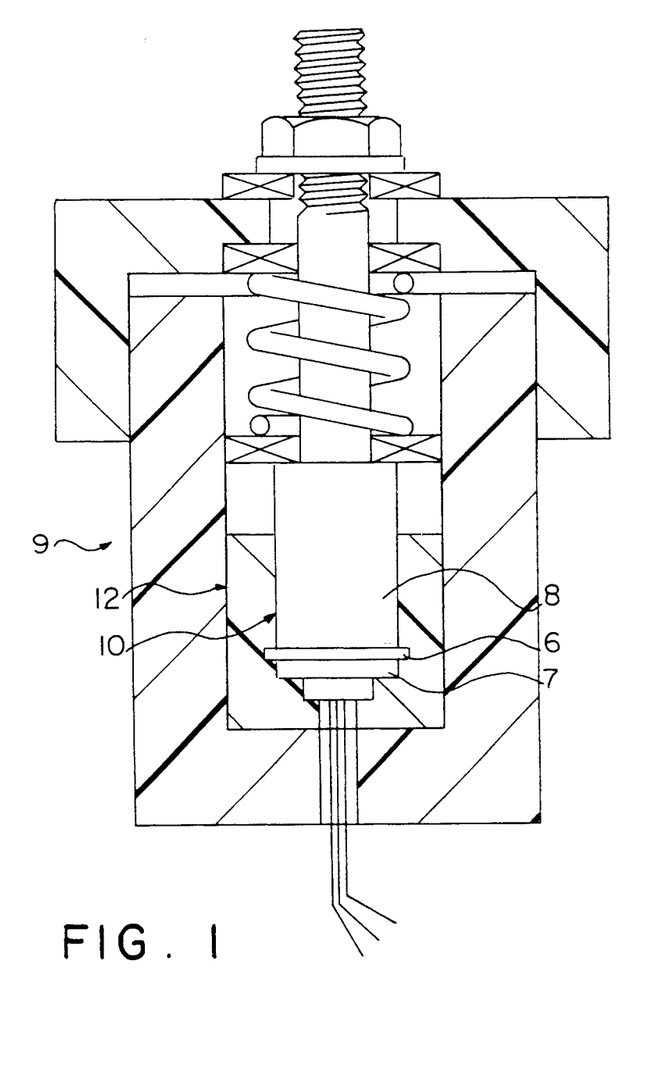
FIG. 1 illustrates a cell assembly as used for measuring conductivity.
Figure 2:
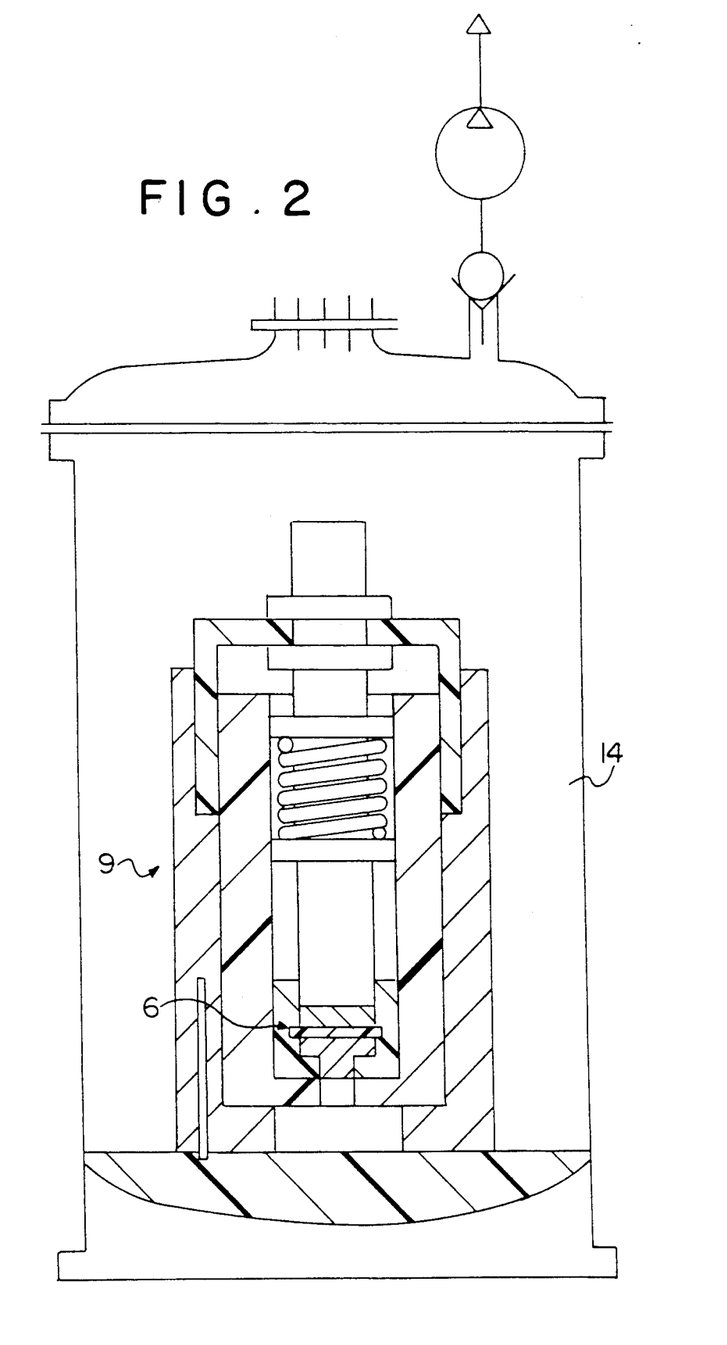
FIG. 2 illustrates a cell and vacuum chamber as used for measuring conductivities.

The cell 10 was then perturbed with a small AC signal generated by a Solartron 1250 Frequency Response Analyzer, and the real and imaginary components of the cell impedance were measured as a function of frequency at each of the desired temperatures. The setup was allowed to stabilize overnight after the temperature was changed. The AC impedance data were plotted in both the Nyquist and Bode planes to identify the high frequency relaxation arising due to the polymer electrolyte. Typically, the frequency of the AC signal was scanned from 65 KHz down to 10 mHz. The intercept at the real axis of the high frequency relaxation was assumed to represent the resistive component of the polymer electrolyte impedance. This was then converted to the resistivity of the polymer (the thickness and the area of the polymer film 6 were known).

Figure 3:
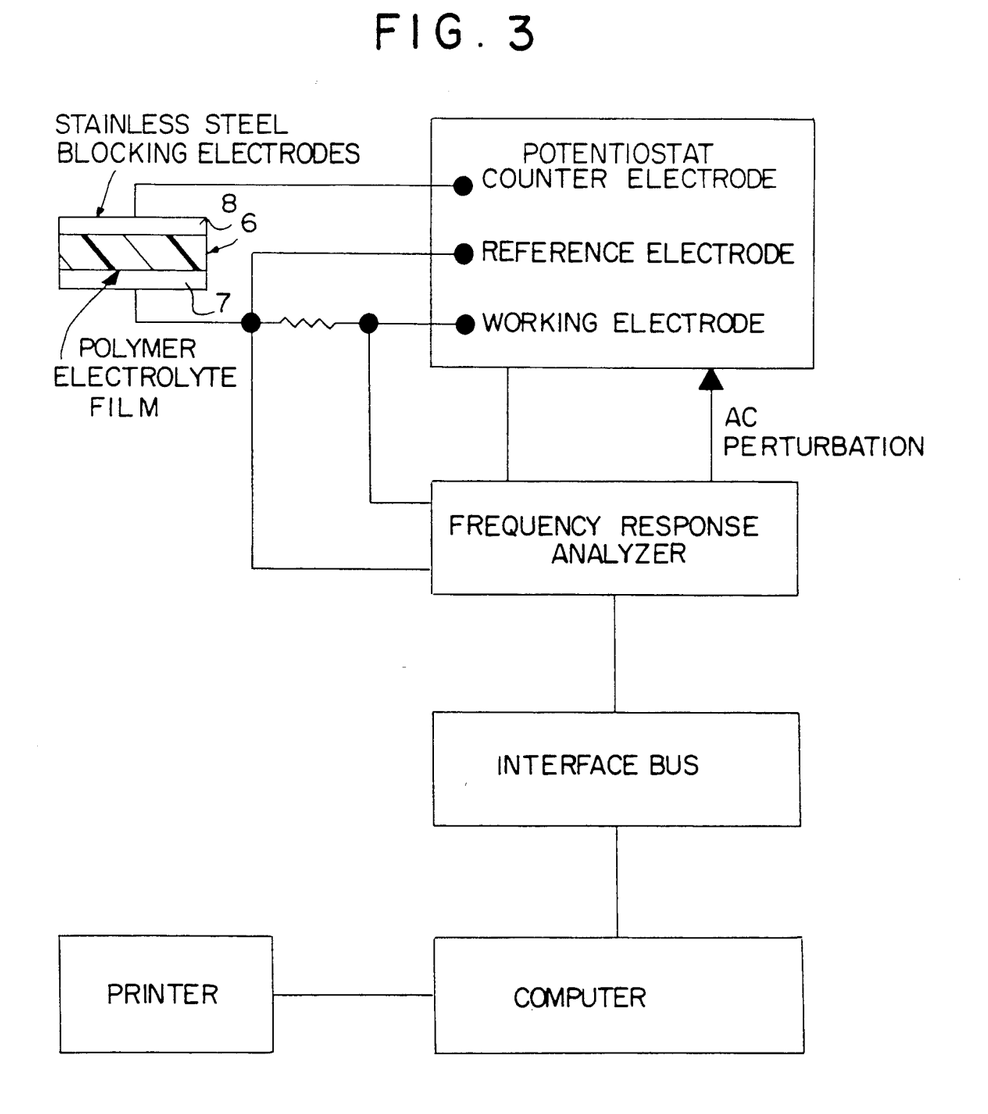
FIG. 3 illustrates, schematically, an experimental setup as used for AC impedance (conductivity) measurements.

The reciprocal of resistivity gave the conductivity, $\sigma$, having units of $\Omega^{-1}\text{cm}^{-1}$. In cases where high frequency relaxation occurred above 65 KHz, a Hewlett Packard 4192A Impedance Analyzer was used to measure the polymer electrolyte resistance. This instrument has a frequency range capability of 13 MHz to 5 Hz. The experimental setup 16 used for conductivity measurements is shown in FIG. 3.

The battery performance tests utilized a PAR 173 potentiostat/galvanostat to produce constant current charge/discharge cycles between predetermined voltage levels.

Preparation Of Polymer/Lithium Complexes

Solutions of polymer/Li triflate complexes were prepared by dissolving a known quantity of $LiCF_3SO_3$ and polymer in dry solvent. The weights used were such that the molar ratio of oxygen atoms plus sulfur atoms to lithium atoms was 8. (The oxygen atoms in the backbone of the polymer are not used in the calculation). The mixture was then allowed to stand overnight.

For conductivity measurements, the polymer/Li complex solution was added dropwise into the Delrin cup to cast a film. The film was then dried for 3 days in a glass vacuum apparatus at 120° C. at <0.01 torr. Film thickness was measured using a micrometer.

For battery tests, the solvent from the polymer/Li complex solution was allowed to evaporate in the dry box. The complex was then transferred to the Delrin cup and vacuum dried as described above.

Preparation Of $V_6O_{13}$ Cathodes

Vanadium oxide was prepared by thermally decomposing ammonium vanadate in argon. $NH_4VO_3$ was placed in a quartz boat and flushed with argon for 30 minutes. The temperature was then raised from room temperature to 500° C. at a rate of 4°/min. After 1 hour at 500° C., the temperature was raised to 550° C. at a rate of 4°/min., held at 55° C. for 1 hour and then slowly cooled to room temperature. The product obtained was dark blue in color.

The composition of the cathode was 80% $V_6O_{13}$, 5.5% Shawinigan black, and 14.5% polymer/LiTF complex by weight. The amounts of $V_6O_{13}$ and Shawinigan black required were weighed into a polycarbonate vial and ground for 5 minutes in a Wig-L-Bug grinder. The mixture was dried for 3 days at 140° C. and <0.1 torr in an Abderhalden drying apparatus. In a 3 mL vial, 100 mg of polymer/LiTF complex was mixed with 589.7 mg of $V_6O_{13}$/Shawinigan black in THF. The mixture was intermittently shaken and allowed to stand overnight before the solvent was evaporated off in the dry box. The cathode mixture (100 mg) was pressed at 10,000 lb for 3 minutes in a stainless steel die with area of 1.69 $cm^2$.

Battery Assembly $MoS_2$ and $V_6O_{13}$ cathodes were cut to size with a 1-cm-diameter punch. The cathodes were attached to the stainless steel plate in the Delrin cup with conducting epoxy (Cho-Bond 584). The adhesive was cured at 120° C. for 1 hour. Approximately 100 mg of the polymer/LiTF complex was weighed into the cup to form a film, as described above. Lithium anodes were freshly prepared by cutting lithium ribbon with the same punch and sanding the surfaces with emery paper. The cup was then loaded into the cell assembly as shown in FIG. 1.

Table II lists the experimentally determined conductivities of various amorphous ionically conductive macromolecular solids in accordance with the present invention as compared with the ionic conductivity of polyethylene oxide.

Figure 4:
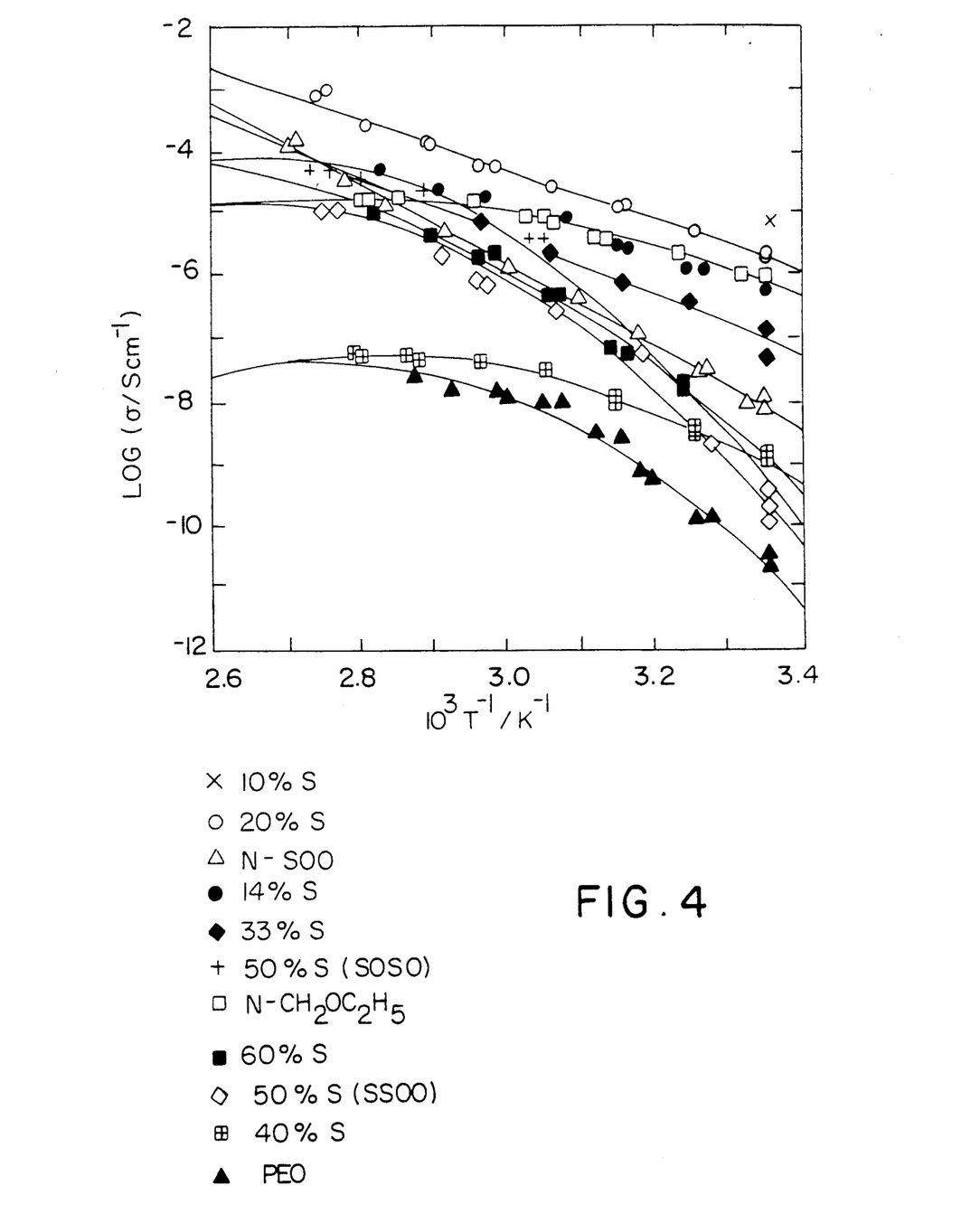
FIG. 4 illustrates, graphically, the conductivity of compositions of the present invention as compared to a composition of the prior art.

FIG. 4 shows the experimental results obtained using various polymer systems in accordance with the invention in comparison with PEO via a graph of log sigma (conductivity) vs 1000/T°K of the cell where T°K is the temperature in degrees Kelvin. The compositions tested are listed in Table I. Note that by proper selection of the polymer system conductivity increases of five orders of magnitude are attainable.

TABLE II

| | Conductivity Data Measured at 25° C. | |
|---|---|---|
| Polymer | Electrodes | Conductivity |
| PEO | SS/SS | $2.51 \times 10^{-11}$ |
| 10% S | SS/SS | $7.10 \times 10^{-5}$ |
| 14% S | SS/SS | $4.22 \times 10^{-7}$ |
| 20% S | SS/SS | $1.27 \times 10^{-6}$ |
| 20% S | $Li/V_6O_{13}$ | $1.98 \times 10^{-6}$ |
| 33% S | SS/SS | $1.10 \times 10^{-7}$ |
| 40% S | SS/SS | $9.13 \times 10^{-10}$ |
| 50% S (SSOO) | SS/SS | $1.62 \times 10^{-10}$ |
| 50% S (SOSO) | SS/SS | $6.38 \times 10^{-10}$ |
| 60% S | SS/SS | $1.40 \times 10^{-8}$* |
| 75% S | SS/SS | $4.64 \times 10^{-10}$** |
| N—SOO*** | SS/SS | $9.18 \times 10^{-9}$ |
| $NCH_2OC_2H_5$ | SS/SS | $7.69 \times 10^{-7}$ |

*indicates 35° C. measurement.
**indicates 65° C. measurement.
***indicates structure 13 of Table I
SS indicates stainless steel.

The lithium salt was the triflate and the molar ratio of oxygen plus sulfur (or nitrogen) to lithium was 8 in all instances. Conductivity is in $\text{ohms}^{-1}\text{cm}^{-1}$.

Industrial Applicability

The present invention provides an amorphous ionically conductive macromolecular solid having use as a solid polymer electrolyte and/or as an electrode. Relatively high conductivity is provided and such is believed to be due to improved mobility of the positively charged ionic species throughout the macromolecular material which forms the major portion of the macromolecular solid.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

That which is claimed is:

1. An amorphous ionically conductive macromolecular solid having improved ambient temperature ionic conductivity, comprising a solid solution of at least one positively charged ionic species dissolved in a macromolecular material, said macromolecular material comprising a polymer or copolymer having a linear polyether structure and having in the range of about 2% of 75% of the ether oxygen atoms thereof replaced with heteroatomic moieties comprising sulfur atoms.

2. The macromolecular solid of claim 1, wherein about 10% to 75% of the ether oxygen atoms are replaced with heteroatomic moieties comprising sulfur atoms.

3. The macromolecular solid of claim 2, wherein about 10% to 33% of the ether oxygen atoms are replaced with heteroatomic moieties comprising sulfur atoms.

4. The macromolecular solid of claim 1, wherein the heteroatomic moieties comprise both sulfur atoms and amino linkages —NR— wherein R has 2 to 10 carbon atoms and includes at least one basic site capable of associating with said positively charged ionic species.

5. The macromolecular solid of claim 2, wherein the heteroatomic moieties comprise both sulfur atoms and amino linkages —NR— wherein R has 2 to 10 carbon atoms and includes at least one basic site capable of associating with said positively charged ionic species.

6. The macromolecular solid of claim 1, wherein the ionic species is selected from the group consisting of sodium, lithium and potassium.

7. An amorphous ionically conductive macromolecular solid having improved ambient temperature ionic conductivity, comprising a solid solution of at least one positively charged ionic species dissolved in a macromolecular material, said macromolecular material comprising a polymer or copolymer having the formula

—(X—C(R₁)₂C(R₁)₂—Y—C(R₁)₂C(R₁)₂)ₙ— wherein:
X and Y are selected from the group of O, S and NR where R has 2 to 10 carbon atoms and includes at least one basic site capable of associating with said positively charged ionic species, with the proviso that 10% to 75% of X and Y are other than O, and with the further proviso that the polymer or copolymer contains S; and
each R₁ is the same or different and is independently H or a C₁₋₄ saturated or C₂₋₄ unsaturated hydrocarbon radical optionally substituted with halide.

8. The macromolecular solid of claim 7, wherein 10% to 75% of X and Y are heteroatomic moieties comprising sulfur atoms.

9. The macromolecular solid of claim 7, wherein 10% to 75% of X and Y are heteroatomic moieties comprising both sulfur atoms and amino linkages —NR— wherein R has 2 to 10 carbon atoms and includes at least one basic site capable of associating with said positively charged ionic species.

10. The macromolecular solid of claim 9, wherein at least one basic site comprises an ether or thioether linkage or a group —PO, —PO₂, —PO₃, —SbO, —SO, —SO₂, —AsO, or —NR″₂ where each R″ is independently hydrogen, alkyl of 1 to 10 carbon atoms, alkenyl of 2 to 10 carbon atoms, or aryl of 6 to 10 carbon atoms.

11. The macromolecular solid of claim 9, wherein at least one basic site comprises an ether or thioether linkage.

12. The macromolecular solid of claim 7, wherein the ionic species is selected from the group consisting of sodium, lithium and potassium.

13. The macromolecular solid of claim 1, wherein the polymer or copolymer is selected from the group consisting of
(—SCH₂CH₂SCH₂CH₂SCH₂CH₂OCH₂CH₂—)ₙ;
(—SCH₂CH₂SCH₂CH₂SCH₂CH₂OCH₂CH₂OCH₂CH₂—)ₙ;
(—SCH₂CH₂OCH₂CH₂—)ₙ;
(—SCH₂CH₂SCH₂CH₂OCH₂CH₂OCH₂CH₂—)ₙ;
(—SCH₂CH₂SCH₂CH₂OCH₂CH₂OCH₂CH₂OCH₂CH₂—)ₙ;
(—SCH₂CH₂OCH₂CH₂OCH₂CH₂—)ₙ;
(—SCH₂CH₂OCH₂CH₂OCH₂CH₂OCH₂CH₂OCH₂CH₂—)ₙ;
(—S—(CH₂CH₂O)₆CH₂CH₂—)ₙ;
(—S—(CH₂CH₂O)₉CH₂CH₂—)ₙ; and $$((-CH_2CH_2SCH_2CH_2O-)_{0.7}(-CH_2CH_2SCH_2CHO-)_{0.3})_n$$
$$\phantom{xxxxxxxxxxxxxxxxxxxxxxxxxxxx}|$$
$$\phantom{xxxxxxxxxxxxxxxxxxxxxxxxxxxx}CH_3$$

where n is the degree of polymerization.

14. The macromolecular solid of claim 1, wherein the polymer has the structure (—CH₂NCH₂)ₙ
    |
  CH₂OCH₂CH₃

(—CH₂NCH₂—)ₙ   ; and
    |
  CH₂CH₂OC₂H₅

(—CH₂NCH₂—)ₙ
    |
  CH₂CH₂SCH₂OCH₂CH₂OCH₃ where n is the degree of polymerization.

* * * * *